United States Patent
Kalyanasundharam et al.

(10) Patent No.: US 7,328,371 B1
(45) Date of Patent: Feb. 5, 2008

(54) CORE REDUNDANCY IN A CHIP MULTIPROCESSOR FOR HIGHLY RELIABLE SYSTEMS

(75) Inventors: Vydhyanathan Kalyanasundharam, San Jose, CA (US); William A. Hughes, San Jose, CA (US); Philip E. Madrid, Round Rock, TX (US); Scott A. White, Austin, TX (US); Ajay Naini, Saratoga, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 557 days.

(21) Appl. No.: 10/966,466

(22) Filed: Oct. 15, 2004

(51) Int. Cl.
*G06F 11/00* (2006.01)
(52) U.S. Cl. .............................. 714/11; 712/22; 712/34
(58) Field of Classification Search .................. 714/11; 712/22, 34
See application file for complete search history.

(56) References Cited

U.S. PATENT DOCUMENTS

| | | | |
|---|---|---|---|
| 5,799,022 A | 8/1998 | Williams | |
| 5,903,717 A * | 5/1999 | Wardrop | 714/12 |
| 6,393,582 B1 * | 5/2002 | Klecka et al. | 714/11 |
| 6,571,363 B1 | 5/2003 | Steiss | |
| 6,862,693 B2 * | 3/2005 | Chaudhry et al. | 714/11 |
| 6,928,583 B2 * | 8/2005 | Griffin et al. | 714/11 |
| 7,003,691 B2 * | 2/2006 | Safford et al. | 714/11 |
| 7,085,959 B2 * | 8/2006 | Safford | 714/11 |
| 2002/0144177 A1 * | 10/2002 | Kondo et al. | 714/13 |
| 2005/0273653 A1 * | 12/2005 | Zubkow | 714/11 |
| 2005/0278567 A1 * | 12/2005 | Wolfe et al. | 714/11 |
| 2006/0248384 A1 * | 11/2006 | Safford | 714/11 |

* cited by examiner

*Primary Examiner*—Christopher McCarthy
(74) *Attorney, Agent, or Firm*—Lawrence J. Merkel; Meyertons, Hood, Kivlin, Kowert & Goetzel, P.C.

(57) ABSTRACT

In one embodiment, a node comprises a plurality of processor cores and a node controller coupled to the processor cores. The node controller is configured to route communications from the processor cores to other devices in a computer system. The node controller comprises a circuit coupled to receive the communications from the processor cores. In a redundant execution mode in which at least a first processor core is redundantly executing code that a second processor core is also executing, the circuit is configured to compare communications from the first processor core to communications from the second processor core to verify correct execution of the code. In some embodiments, the processor cores and the node controller may be integrated onto a single integrated circuit chip as a CMP. A similar method is also contemplated.

19 Claims, 7 Drawing Sheets

CORE REDUNDANCY IN A CHIP MULTIPROCESSOR FOR HIGHLY RELIABLE SYSTEMS

BACKGROUND

1. Field of the Invention

This invention is related to the field of multiprocessors and, more particularly, to chip multiprocessors (CMPs) and implementing redundant execution for high reliability in CMPs.

2. Description of the Related Art

Fault-tolerant computer systems are used in a variety of applications in the computing world. For example, many servers are implemented on fault-tolerant systems so that the servers may be available as close to 24 hours a day as possible. Any mission-critical computing functions may benefit from being assigned to fault-tolerant computer systems.

One of the aspects of fault-tolerant computer systems is high reliability through the early detection of errors in operation. For example, some fault-tolerant systems may implement high reliability by including multiple processors and having them redundantly execute the same software code. The results of executing the code can be compared, and any discrepancies may be detected as an error. The processors are discrete, individual integrated circuits, and thus such a solution is costly both in terms of the number of integrated circuits needed and the circuit board space required to connect the processors to the rest of the computer system. Additionally, since the processors are discrete, controlling the processors to execute in lockstep or to otherwise synchronize is complex and error prone, and typically requires additional circuitry to be included in the computer system (external from the processors) to carry out.

SUMMARY

In one embodiment, a node comprises a plurality of processor cores and a node controller coupled to the processor cores. The node controller is configured to route communications from the processor cores to other devices in a computer system. The node controller comprises a circuit coupled to receive the communications from the processor cores. In a redundant execution mode in which at least a first processor core is redundantly executing code that a second processor core is also executing, the circuit is configured to compare communications from the first processor core to communications from the second processor core to verify correct execution of the code. In some embodiments, the processor cores and the node controller may be integrated onto a single integrated circuit chip as a CMP. A similar method is also contemplated.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
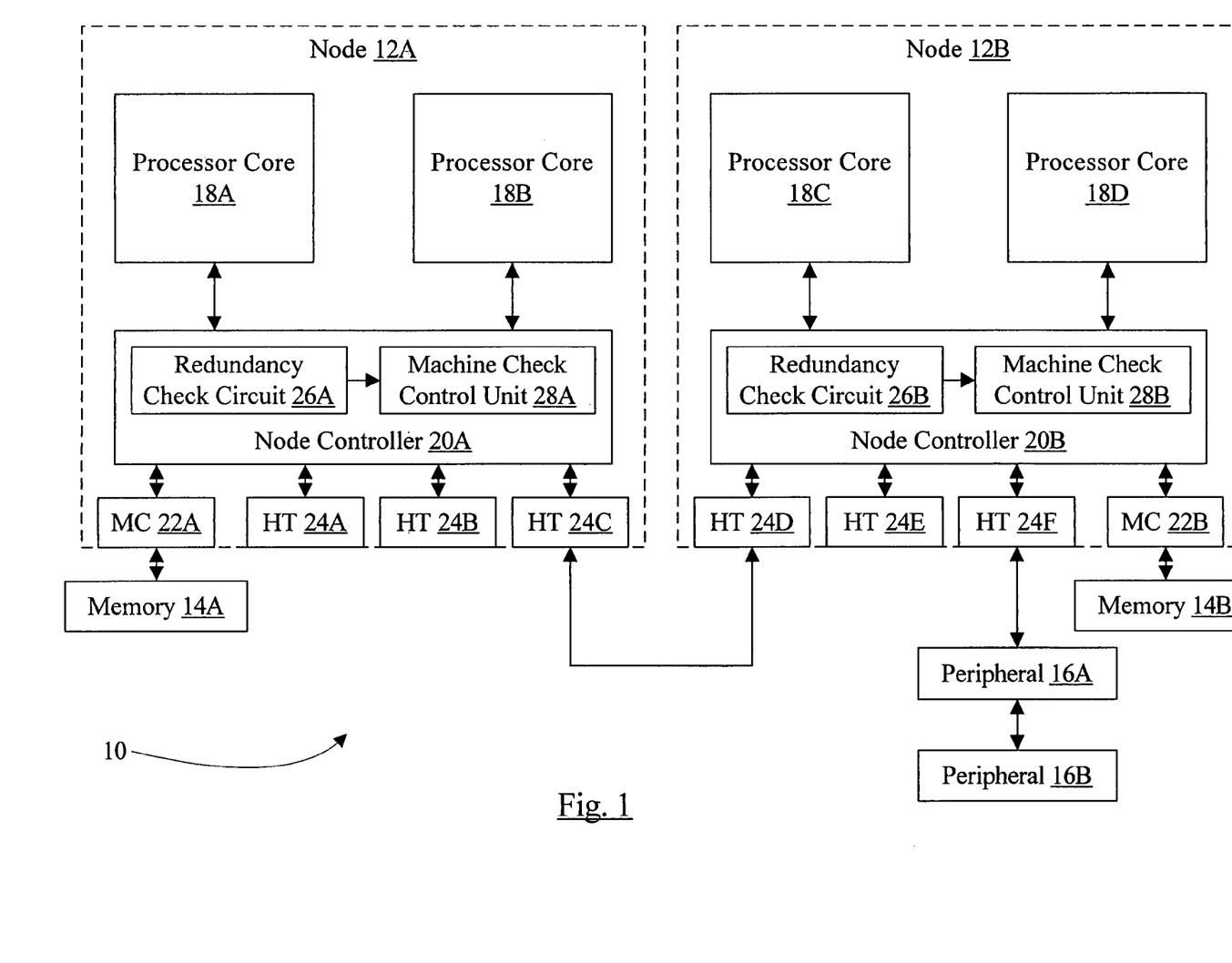
FIG. 1 is a block diagram of one embodiment of a computer system.

Turning now to FIG. 1, a block diagram of one embodiment of a computer system 10 is shown. In the illustrated embodiment, the computer system 10 includes nodes 12A-12B, memories 14A-14B, and peripheral devices 16A-16B. The nodes 12A-12B are coupled, and the node 12B is coupled to the peripheral devices 16A-16B. Each of the nodes 12A-12B are coupled to respective memories 14A-14B. The node 12A comprises processor cores 18A-18B coupled to a node controller 20A which is further coupled to a memory controller 22A and a plurality of HyperTransport™ (HT) interface circuits 24A-24C. The node 12B similarly comprises processor cores 18C-18D coupled to a node controller 20B which is further coupled to a memory controller 22B and a plurality of HT interface circuits 24D-24F. The HT circuits 24C-24D are coupled (via an HT interface, in this embodiment) and the HT circuit 24F is coupled to the peripheral device 16A, which is coupled to the peripheral device 16B in a daisy-chain configuration (using HT interfaces, in this embodiment). The memory controllers 22A-22B are coupled to the respective memories 14A-14B. In one embodiment, each of the nodes 12A-12B may be a single integrated circuit chip comprising the circuitry shown therein in FIG. 1. That is, each node 12A-12B may be a chip multiprocessor (CMP). Other embodiments may implement the nodes 12A-12B as two or more separate integrated circuits, as desired. Any level of integration or discrete components may be used.

In the illustrated embodiment, each of the node controllers 20A-20B includes a redundancy check circuit and a machine check control unit. For example, the node controller 20A includes a redundancy check circuit 26A and a machine check control unit 28A, and the node controller 20B includes a redundancy check circuit 26B and a machine check control unit 28B. The operation of the redundancy check circuit 26A and the machine check control unit 28A will be described in more detail herein, and the operation of the redundancy check circuit 26B and the machine check control unit 28B may be similar.

The node controller 20A may generally be configured to receive communications from the processor cores 18A-18B, the memory controller 22A, and the HT circuits 24A-24C and to route those communications to the processor cores 18A-18B, the HT circuits 24A-24C, and the memory controller 22A dependent upon the communication type, the address in the communication, etc. In one embodiment, the node controller 20A includes a system request queue (SRQ) into which received communications are written by the node controller 20A. The node controller 20A may schedule communications from the SRQ for routing to the destination or destinations among the processor cores 18A-18B, the HT circuits 24A-24C, and the memory controller 22A. The node controller 20B may be similar with regard to the processor cores 18C-18D, the HT circuits 24D-24F, and the memory controller 22B. Operation of the node 12A and its components will be discussed in more detail below. Operation of the node 12B and its components may be similar.

Generally, the processor cores 18A-18B may use the interface(s) to the node controller 20A to communicate with other components of the computer system 10 (e.g. peripheral devices 16A-16B, processor cores 18C-18D, the memory controllers 22A-22B, etc.). The interface may be designed in any desired fashion. Cache coherent communication may be defined for the interface, in some embodiments. In one embodiment, communication on the interfaces between the node controller 20A and the processor cores 18A-18B may be in the form of packets similar to those used on the HT interfaces. In other embodiments, any desired communication may be used (e.g. transactions on a bus interface, packets of a different form, etc.). Generally, the communications from the processor cores 18A-18B may include requests such as read operations (to read a memory location or a register external to the processor core) and write operations (to write a memory location or external register), responses to probes (for cache coherent embodiments), interrupt acknowledgements, system management messages, etc. In the illustrated embodiment, each processor core 18A-18B may have a separate communication path to the node controller 20A. The communication path may be implemented in a variety of fashions (e.g. a bus, point-to-point interconnect in each direction, etc.).

In one embodiment, the node 12A may support a redundant execution mode in which the processor cores 18A-18B redundantly execute the same software code on the same data. The processor cores 18A-18B may be copies of the same processor design (with the same size caches, the same register files, etc.). Accordingly, if no errors in execution have occurred, communications generated by the processor core 18A should match corresponding communications generated by the processor core 18B in redundant execution mode. For example, the same address should be included in corresponding communications, the same data should be included, etc. Errors that may occur in execution may include soft errors such as soft memory errors (e.g. those detectable using an error checking code (ECC) scheme) or soft communication errors such as noise or interference in the transmission of communications. Errors may also include hard errors such as errors caused by hardware failures.

The redundancy check circuit 26A receives communications generated by the processor cores 18A-18B and, in redundant execution mode, compares the corresponding communications to verify correct execution of the software code. If a mismatch is detected in the comparison, the redundancy check circuit 26A may signal an execution error. An execution error may be any indication that an error has occurred in the execution of the software code, detected via the redundant execution. In the embodiment of FIG. 1, it may not be clear which processor core 18A-18B experienced the error, but the error is detected. Diagnostic software may be used to determine which processor core 18A-18B experienced the error and what corrective measures are to be taken. In various embodiments, the execution error may be signalled in a variety of fashions. For example, in the present embodiment, the redundancy check circuit 26A may signal a machine check exception to the machine control unit 28A. The machine check control unit 28A may cause a machine check exception in at least one of the processor cores 18A-18B (e.g. the processor core 18A-18B designated as the primary processor core described below). Other embodiments may use other exceptions, external interrupts, logging of execution errors to be checked by software, etc. to signal an execution error. Still other embodiments may use any combination of the above to signal an execution error.

In one embodiment, the processor cores 18A-18B may execute in lockstep (that is, may execute the same instructions on the same clock cycle). In CMP embodiments of the node 12A, the processor cores 18A-18B may execute at the same clock frequency and may be driven from the same clock source (derived from a clock input to the node 12A, not shown in FIG. 1). Thus, once the processor cores 18A-18B initiate execution of the software in synchronization, they may remain synchronized as long as they receive communications (e.g. responses to requests) from the node controller 20A concurrently. That is, hardware external to the node 12A may not be required to run the processor cores 18A-18B in lockstep. In embodiments in which the processor cores 18A-18B execute in lockstep, the redundancy check circuit 26A may check that corresponding communications are concurrently received from the processor cores 18A-18B (e.g. received on the same clock cycle). For example, if a valid communication is received from one of the processor cores 18A-18B and a valid communication is not concurrently received from the other processor core 18A-18B, an execution error may be detected.

The node controller 20A may be configured to propagate communications from one of the processor cores 18A-18B (e.g. from the primary processor core) and to discard communications from the other processor core 18A-18B (e.g. from the auxiliary processor core). The node controller 20A may route the propagated communications as appropriate (e.g. to the memory controller 22A or one or more of the HT circuits 24A-24C). Some communications may result in responses to be returned to the processor cores 18A-18B. For example, read requests may result in responses that return the read data. The node controller 20A may concurrently provide the response to both processor cores 18A-18B. Similarly, for external communications received by the node controller 20A that are to be routed to the processor cores 18A-18B (such as probes, system management commands, etc.), the node controller 20A may concurrently provide the communications to the processor cores 18A-18B. For a probe, the probe response from one of the processor cores 18A-18B may be forwarded to the probe source and the other probe response from the other processor core 18A-18B may be discarded after being used to verify the forwarded probe response.

Generally, one of the processor cores 18A-18B may be designated as a primary processor core and the other processor core 18A-18B is referred to as the auxiliary processor core. The primary processor core may be the processor core whose execution results will be used as the result of executing the redundantly-executed software code. The auxiliary processor core is used to verify correct execution by the primary processor core. In other embodiments, more than two processor cores may be provided in a node. In such embodiments, one processor core may be the primary core and two or more of the remaining processor cores may be auxiliary processor cores. In one implementation, all the remaining processor cores may be used as auxiliary processor cores.

The identification of the primary processor core may be programmable (e.g. in a register in the redundancy check circuit 26A, in one embodiment). The programmable embodiment is used as an example for the remainder of the disclosure. Alternatively, the primary processor core may be fixedly defined (e.g. via fuses in the node 12A, pins to the node 12A, etc.).

In a CMP embodiment, the node 12A may provide a low cost approach to redundant execution. The node 12A may be a single integrated circuit chip, occupying one location on a circuit board included in the computer system 10. Additionally, no external hardware may be required, in some embodiments, as mentioned above. The embodiment of the computer system 10 may be a multiprocessor computer system (one "processor" per node 12) with redundancy for each "processor" implemented internally. Other embodiments of the computer system 10 may have a single node 12A and may be uniprocessor system with redundancy. Additionally, in some embodiments, the computer system 10 may execute with redundant execution mode disabled, providing an execution environment without redundancy and each processor core 18A-18B may be used independently.

As mentioned above, the software code that is to be executed redundantly may be executed in lockstep, in some embodiments. By providing responses, probes, and other communications to the processor cores 18A-18B concurrently, the processor cores 18A-18B may naturally remain in lockstep. Synchronization of the launching of execution (to get the processor cores 18A-18B executing in lockstep) may be performed in a variety of fashions. For example, a software semaphores may be used to control the beginning of execution of the software code, and the response that provides the semaphore data that releases execution may be provided concurrently to the processor cores 18A-18B. In other embodiments, the processor cores 18A-18B may be put in lockstep from the first instruction fetch after reset, or the first fetch of the software code to be executed redundantly, again by providing the response for the first fetch to each processor core 18A-18B concurrently.

The memories 14A-14B may comprise any suitable memory devices. For example, a memory 14A-14B may comprise one or more RAMBUS DRAMs (RDRAMs), synchronous DRAMs (SDRAMs), double data rate (DDR) SDRAM, static RAM, etc. The address space of the computer system 10 may be divided among memories 14A-14B. Each node 12A-12B may include a memory map (e.g. in the node controller 20A) used to determine which addresses are mapped to which memories 14A-14B, and hence to which node 12A-12B a memory request for a particular address should be routed. The memory controllers 22A-22B may comprise control circuitry for interfacing to the memories 14A-14B. Additionally, the memory controllers 22A-22B may include request queues for queuing memory requests, etc.

The HT circuits 24A-24F may comprise a variety of buffers and control circuitry for receiving packets from an HT link and for transmitting packets upon an HT link. The HT interface comprises unidirectional links for transmitting packets. Each HT circuit 24A-24F may be coupled to two such links (one for transmitting and one for receiving). A given HT interface may be operated in a cache coherent fashion (e.g. between nodes 12A-12B) or in a non-coherent fashion (e.g. to/from peripheral devices 16A-16B). In the illustrated embodiment, the HT circuits 24C and 24D are coupled via coherent HT links for communicating between the nodes 12A-12B. The HT circuits 24A-24B and 24E are not in use, and the HT circuit 24F is coupled via non-coherent links to the peripheral devices 16A-16B.

The peripheral devices 16A-16B may be any type of peripheral devices. For example, the peripheral devices 16A-16B may include devices for communicating with another computer system to which the devices may be coupled (e.g. network interface cards, circuitry similar to a network interface card that is integrated onto a main circuit board of a computer system, or modems). Furthermore, the peripheral devices 16A-16B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "peripheral device" is intended to encompass input/output (I/O) devices.

Generally, a processor core 18A-18D may comprise circuitry that is designed to execute instructions defined in a given instruction set architecture. That is, the processor core circuitry may be configured to fetch, decode, execute, and store results of the instructions defined in the instruction set architecture. The processor cores 18A-18D may comprise any desired configurations, including superpipelined, superscalar, or combinations thereof. Other configurations may include scalar, pipelined, non-pipelined, etc. Various embodiments may employ out of order speculative execution or in order execution. The processor core may include microcoding for one or more instructions or other functions, in combination with any of the above constructions. Various embodiments may implement a variety of other design features such as caches, translation lookaside buffers (TLBs), etc.

It is noted that, while the present embodiment uses the HT interface for communication between nodes and between a node and peripheral devices, other embodiments may use any desired interface or interfaces for either communication. For example, other packet based interfaces may be used, bus interfaces may be used, various standard peripheral interfaces may be used (e.g. peripheral component interconnect (PCI), PCI Express™, etc.), etc.

It is noted that, while the computer system 10 illustrated in FIG. 1 comprises two nodes 12A-12B, other embodiments may implement one node or more than two nodes. Similarly, each node 12A-12B may include two or more processor cores, in various embodiments. Various embodiments of the computer system 10 may include different numbers of HT interfaces per node 12A-12B, differing numbers of peripheral devices coupled to one or more of the nodes, etc.

The present discussion refers to a communication from the primary processor core and a corresponding communication from an auxiliary processor core (or corresponding communications from multiple auxiliary processor cores). For a given communication, the corresponding communication may be the communication that, in the absence of any errors, should match the given communication. If the processor cores are running in lock step, the given communication and its corresponding communication(s) may be received in the node controller concurrently (e.g. on the same clock cycle).

Figure 2:
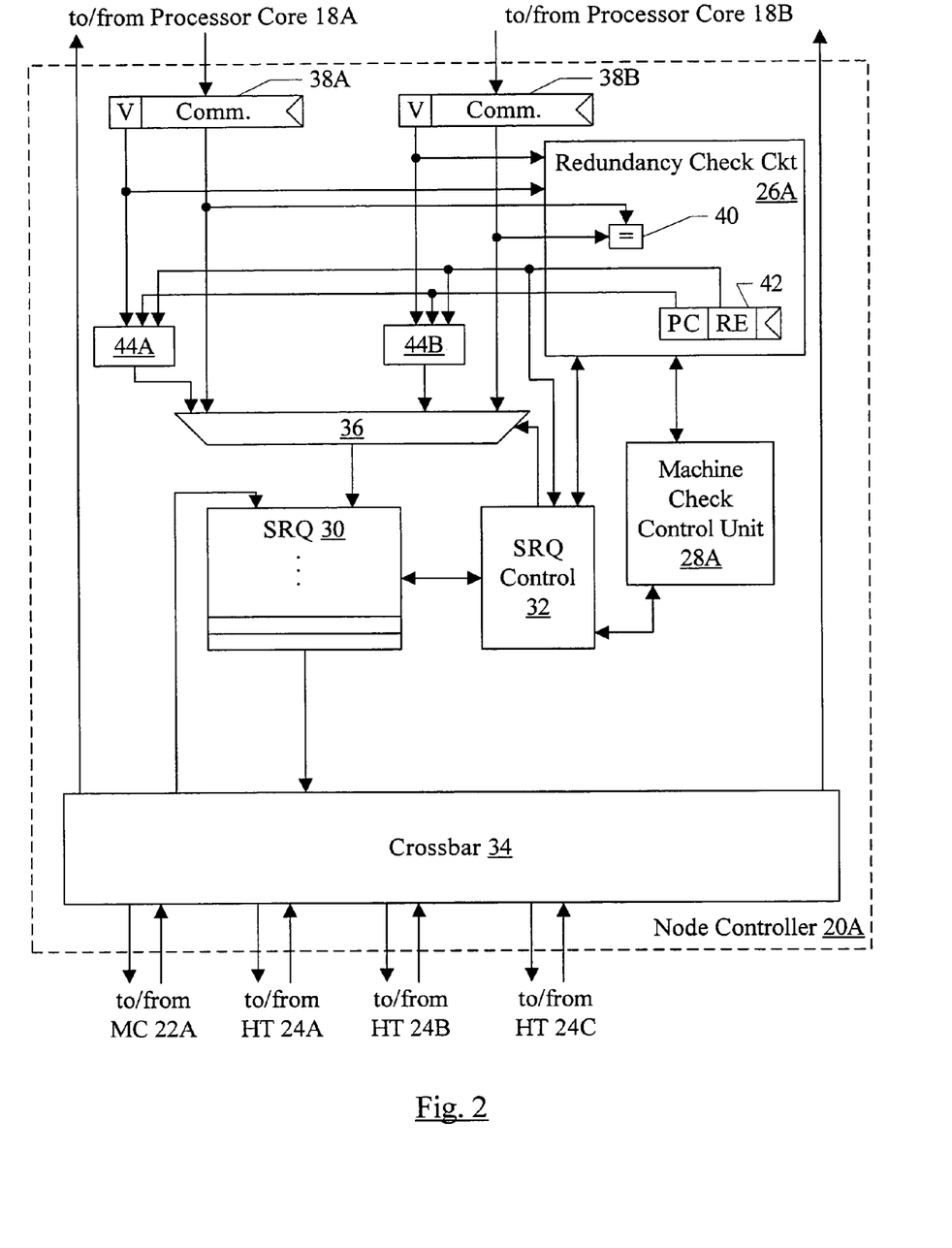
FIG. 2 is a block diagram of one embodiment of a node controller shown in FIG. 1.

Turning now to FIG. 2, a block diagram illustrating one embodiment of a portion of the node controller 20A is shown. In the illustrated embodiment, the node controller 20A includes a system request queue (SRQ) 30, an SRQ control unit 32, a crossbar 34, a multiplexor (mux) 36, a set of input flops 38A-38B, the redundancy check circuit 26A, and the machine check control unit 28A. The flops 38A-38B are coupled to receive communications from the processors 18A-18B, respectively, and are coupled to the mux 36 and the redundancy check circuit 26A. The mux 36 is coupled to receive selection controls from the SRQ control unit 32 and is coupled to the SRQ 30. The SRQ control unit 32 is coupled to the SRQ 30, the redundancy check circuit 26A, and the machine check control unit 28A. The SRQ 30 is coupled to the crossbar 34, which is further coupled to receive and provide communications to the HT circuits 24A-24C and the memory controller 22A, and to provide communications to the processor cores 18A-18B. In the illustrated embodiment, the redundancy check circuit 26A may include a comparator 40 and a configuration register 42. A pair of valid bit update circuits 44A-44B are also shown in FIG. 2, coupled to receive valid bits from the flops 38A-38B (respectively), coupled to receive a PC bit and RE bit from the configuration register 42, and coupled to the mux 36.

The SRQ 30 is configured to store external communications (e.g. requests, responses, etc.) received by the node 12A (e.g. through the HT circuits 24A-24C) as well as internal communications generated by the memory controller 22A (e.g. probes for read/write requests transmitted to the memory controller 22A, read responses providing data for a read request, etc.) and the processor cores 18A-18B (e.g. requests, responses, etc.). Generally, the SRQ 30 comprises multiple entries, each entry configured to store a different communication. The SRQ control unit 32 may be configured to allocate entries for received communications, and may be configured to schedule communications for transmission through the crossbar 34. Additionally, the SRQ control unit 32 may be configured to update state in the SRQ 30 for a given communication in response to completion of various internal activities. For example, if a probe is in the SRQ 30 and the corresponding responses from the processors 18A-18B are received for the probe, the SRQ control unit 32 may update the state in the entry storing the probe to record the receipt of the response and to record the coherency state reported in the response.

The crossbar 34 may comprise circuitry configured to route communications between the various sources and destinations. The sources may include the SRQ 30 (a request scheduled by the SRQ control unit 32), the HT circuits 24A-24C, and the memory controller 22A. The destinations may include the SRQ 30, the HT circuits 24A-24C, the memory controller 22A, and the processor cores 18A-18B. Generally, received communications are routed to the SRQ 30 for later scheduling by the SRQ control unit 32. Communications scheduled from the SRQ 30 and transmitted to the crossbar 34 may include information identifying the destination or destinations for the communication, which the crossbar 34 may use to route the communications.

In the redundant execution mode, the SRQ control unit 32 may be configured to schedule communications to be routed to the processor cores 18A-18B concurrently for routing to both the processor cores 18A-18B. If redundant execution mode is not active, the SRQ control unit 32 may schedule communications for routing to each of the processor cores 18A-18B independently for each core, if desired. If the illustrated embodiment, the control register 42 may store a redundant mode enable (RE) bit which may indicate whether or not redundant execution mode is active (e.g. active when set, not active when clear, although the opposite meanings may also be used). The SRQ control unit 32 may receive the RE bit for use in scheduling decisions.

In the illustrated embodiment, the SRQ 30 may include a write port shared by the processor cores 18A-18B and a write port (or ports) used by the crossbar 34. The processor cores 18A-18B may be configured to transmit a communication (e.g. request or response) to the node controller at most once every other clock cycle. The communications may be captured in the flops 38A-38B and provided to the mux 36. The SRQ control unit 32 may control the mux 36 to write received communications from the flops 38A-38B into the SRQ 30 (or to update an existing entry of the SRQ 30, in the case of a response). If only one communication is received in a given clock cycle, the SRQ control unit 32 may select the corresponding flop 38A-38B through the mux 36. If two communications are received in a given clock cycle, the SRQ control unit 32 may select one flop 38A-38B in one clock cycle and, in the following clock cycle, select the other flop 38A-38B. With the maximum transmission of one communication every other clock cycle, there is time to handle both communications before a new communication may be received. In other embodiments, a direct path from the processor cores 18A-18B may be provided to the mux 36 in addition to the flops 38A-38B, if desired. In still other embodiments, a write port for each processor core 18A-18B may be provided on the SRQ 30 and the mux 36 may be eliminated.

More generally, a node 12A-12B may include N processor cores, where N is an integer greater than one. The processor cores may be configured to transmit a communication at most once every N clock cycles. Thus, N simultaneous communications may be captured and written to the SRQ 30 using a shared write port, similar to the above discussion.

In the redundant execution mode, the communications from the primary processor core may be propagated and the communications from the auxiliary processor core(s) may be discarded. In one embodiment, each communication may include a valid bit (V in the flops 38A-38B) that indicates whether or not a valid communication has been received. The valid bit update circuits 44A-44B may be used to selectively clear the valid bit for communications from the auxiliary processor core. In this embodiment, the PC bit from the configuration register 42 may identify the primary processor core. Accordingly, if redundant execution mode is enabled and the processor core 18A is not identified by the PC bit as the primary processor core, the valid bit update circuit 44A may ensure that the valid bit from the flop 38A is cleared when passed to mux 36. Otherwise, the valid bit from the flop 38A is passed unmodified. Similarly, if redundant execution mode is enabled and the processor core 18B is not identified by the PC bit as the primary processor core, the valid bit update circuit 44B may ensure that the valid bit from the flop 38B is cleared when passed to mux 36. Otherwise, the valid bit from the flop 38B is passed unmodified. In other embodiments, the valid bits may be selectively cleared at the input to the flops 38A-38B, or communications may be propagated/discarded in other fashions. In embodiments that include more than two processor cores, the PC field may be multiple bits identifying the primary processor core and additional valid bit update circuits similar to the circuits 44A-44B may be included for communications from each processor core.

In the illustrated embodiment, the comparator circuit 40 may receive the communications stored in the flops 38A-38B for comparison. If valid communications are received and a mismatch is detected by the comparator circuit 40, the redundancy check circuit 26A may signal an execution error.

The valid bits may also be received by the redundancy check circuit 26A, to verify that the communications are concurrently received.

The machine check control unit 28A may implement machine check functionality, at least for those machine check errors that are detected outside of the processor cores 18A-18B. Generally, machine check errors may be errors detected in the operation of the hardware itself. For example, error correction code (ECC) errors for memory accesses, communication transmission errors, cyclic redundancy check (CRC) errors, parity errors, and the like may cause machine check errors. If a machine check error is detected (and, in one embodiment, if the error is enabled in the machine check control unit 28A), a machine check exception may be delivered to at least one of the processor cores 18A-18B. The machine check exception may cause the receiving processor core 18A-18B to suspend current execution and to fetch instructions from a predefined machine check exception vector for processing the machine check exception. As mentioned above, in the present embodiment, one of the machine check errors is an execution error detected by the redundancy check circuit 26A in the redundant execution mode. If an execution error is signalled by the redundancy check circuit 26A to the machine check control unit 28A, the machine check control unit 28A may cause a machine check exception to be delivered to one of the processor cores 18A-18B. In one embodiment, the machine check exception may be delivered to the primary processor core. In other embodiments, the machine check exception may be delivered to all processor cores, or a subset of the processor cores, if desired.

The SRQ 30 may have any construction (e.g. registers, random access memory (RAM), etc.). In one embodiment, the SRQ 30 may comprise a shift queue storing various state information for each request, an address RAM storing an address provided in the communication, and a data RAM configured to store data associated with the communication (e.g. a cache block located by the address). Each shift queue entry may comprise a pointer to the address RAM and a pointer to the data RAM, locating the corresponding address and data for a communication (if any).

Figure 3:
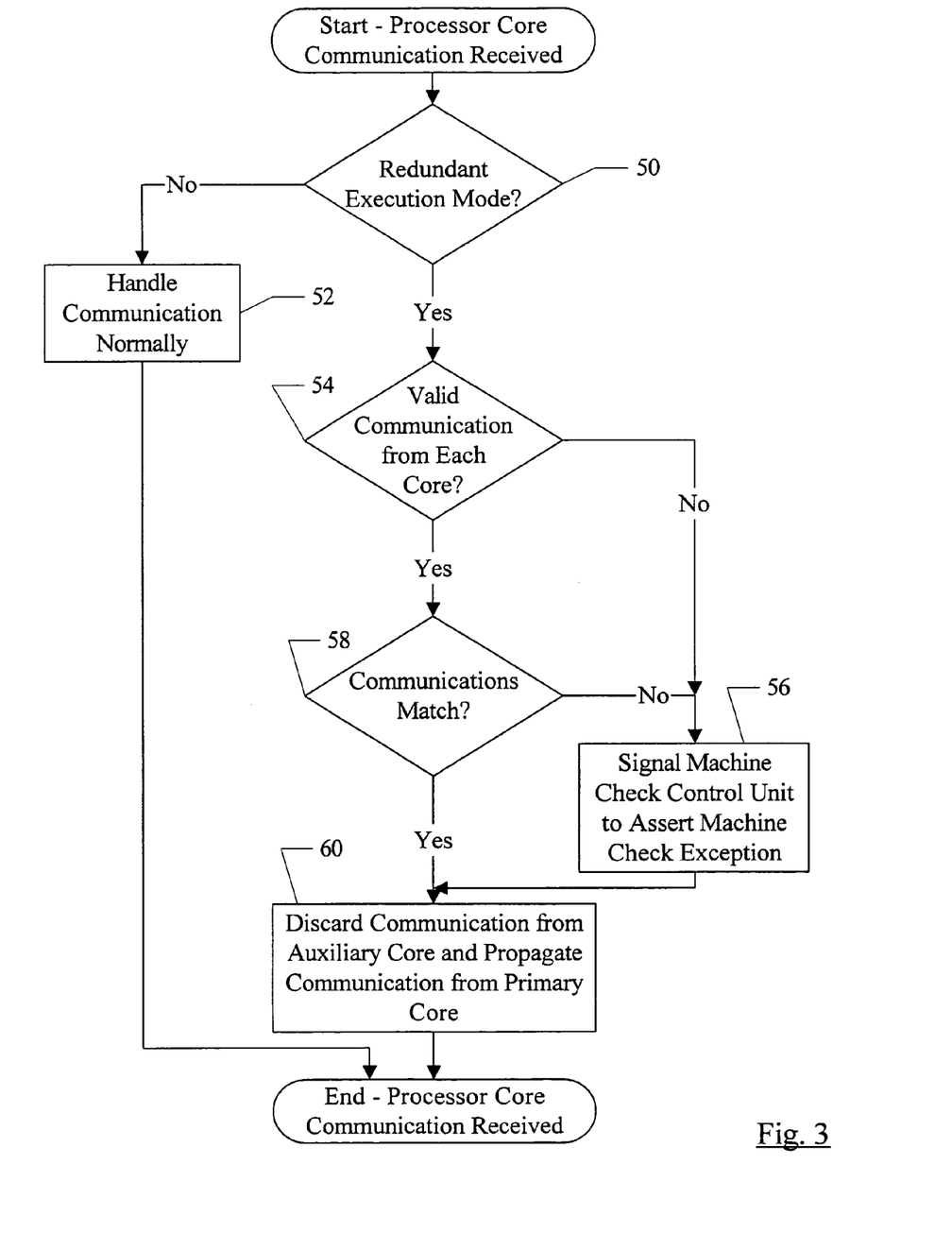
FIG. 3 is a flowchart illustrating operation of one embodiment of a node controller shown in FIGS. 1 and 2 in response to receiving a communication from a processor core.

Turning now to FIG. 3, a flowchart is shown illustrating operation of one embodiment of the node controller 20A (including the redundancy check circuit 26A) in response to receiving a communication from a processor core 18A-18B. While the blocks are shown in a particular order in FIG. 3 for ease of understanding, any order may be used. Furthermore, blocks may be performed in parallel by combinatorial logic circuitry in the node controller 20A. Blocks, portions of the flowchart, or the flowchart as a whole may also be pipelined over multiple clock cycles, if desired. The communication received from the processor core 18A-18B may be a request, a response to a previous communication transmitted to the processor core 18A-18B such as a probe or system management message, etc.

If redundant execution mode is not active (decision block 50, "no" leg), the communication may be handled normally (block 52). That is, no comparison with other communications need be performed. The communication may be handled independent of communications from other processor cores, in general, etc.

If redundant execution mode is active (decision block 50, "yes" leg), the redundancy check circuit 26A may check if a valid communication is received from each processor core (decision block 54). Since the flowchart of FIG. 3 is performed in response to receiving a communication from at least one processor core, then a valid communication should have been received from each processor core. If a valid communication was not received from each processor core (decision block 54, "no" leg), the redundancy check circuit 26A may signal the machine check control unit 28A to assert a machine check exception (block 56). In one embodiment, the machine check exception may be delivered to the primary processor core. If a valid communication is received from each processor core (decision block 54, "yes" leg), the redundancy check circuit 26A may determine if the communications match (decision block 58). For example, the comparator circuit 40 may be used to compare the communications. If the communications do not match (decision block 58, "no" leg), the redundancy check circuit 26A may signal the machine check control unit 28A to assert the machine check exception (block 56). If the communications match (decision block 58, "yes" leg), the node controller 20A may discard the communication from the auxiliary processor core and propagate the communication from the primary processor core (block 60). Propagating the communication may generally include transmitting the communication to its destination. For example, in the embodiment of FIG. 2, propagating the communication may include writing the communication to the SRQ 30, scheduling the communication, and transmitting the communication through the crossbar 34.

It is noted that checking for the concurrent reception of valid communications (decision block 54) and checking for a mismatch in the communications (decision block 58) may be combined. For example, the comparator circuit 40 may receive the valid bits along with the other communication bits and may compare the valid bits in parallel with the other communication bits, detecting a mismatch if at least one bit differs. In other embodiments, the redundancy check circuit 26A may compare the state of the signals used by the processor core 18A to communicate with the node controller 20A to the state of the signals used by the processor core 18B to communicate with the node controller 20A on a clock cycle by clock cycle basis. Such embodiments may be used, for example, if the processor cores 18A-18B are executing in lock step. In such embodiments, a communication as used in the present discussion for comparison may be the state of the signals on a given clock cycle.

In one embodiment, the communication from the primary processor core may be propagated even if the machine check exception is signalled, to ensure that the primary processor core may complete the underlying instruction that caused the communication and thus ensuring that the primary processor core may take the exception. For example, if the primary processor core is expecting a response to the communication, the primary processor core may delay the exception until the response is received. Additionally, if the machine check exception is delivered to the primary processor core and not the auxiliary processor core, the communication may be propagated to ensure that the auxiliary processor core may complete the underlying instruction (e.g. by receiving the response). In other embodiments, the communication from the primary processor core may not be propagated (e.g. if the exception cancels the underlying instruction and permits the exception to be taken).

Figure 4:
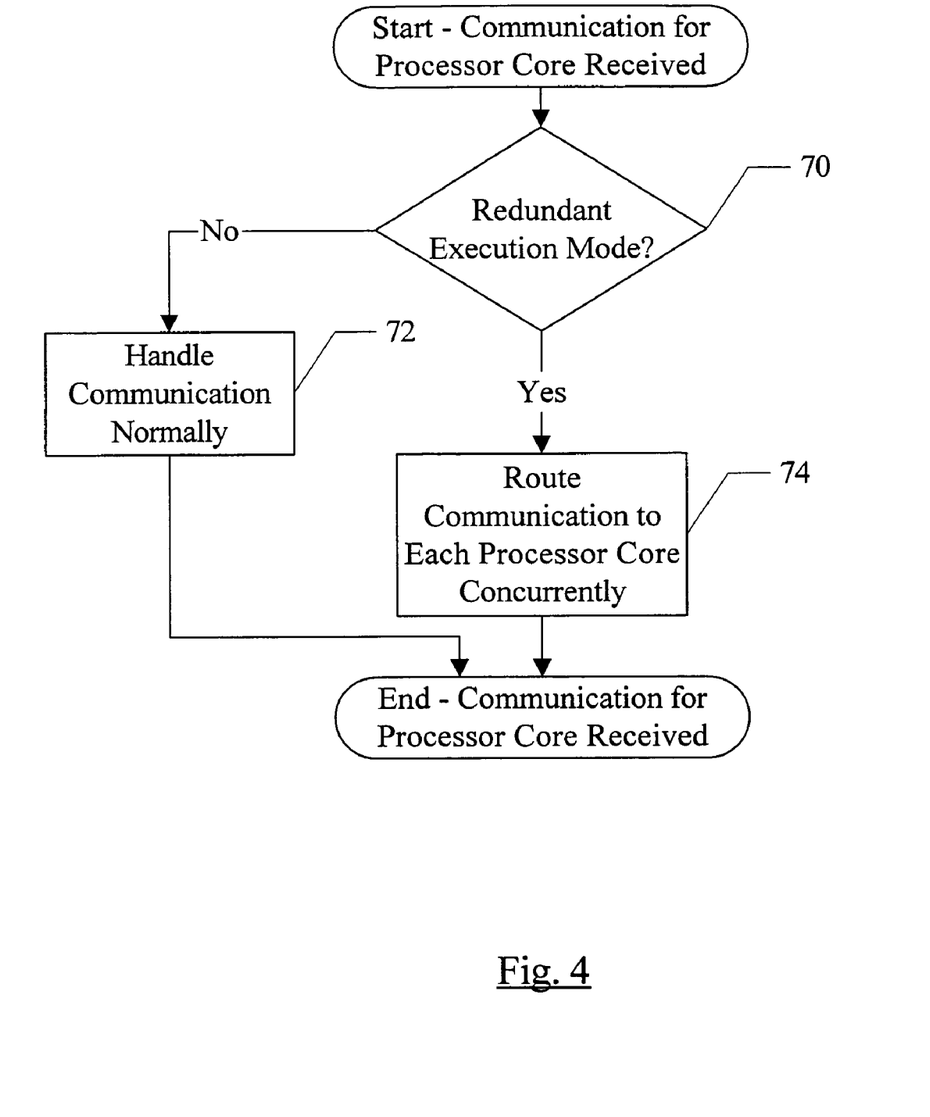
FIG. 4 is a flowchart illustrating operation of one embodiment of a node controller shown in FIGS. 1 and 2 in response to receiving a communication to be routed to the processor cores.

Turning now to FIG. 4, a flowchart is shown illustrating operation of one embodiment of the node controller 20A (including the redundancy check circuit 26A) in response to receiving a communication for a processor core 18A-18B. That is, the communication may be a communication to be routed to the processor core 18A-18B. The communication may be received from the memory controller 22A or the HT circuits 24A-24C, for example. Such communications may include a response to a communication previously transmitted by the processor core (e.g. a read response with data, a done message for a write request, etc.) or may be another communication, such as a probe for maintaining cache coherency or a system management message. While the blocks are shown in a particular order in FIG. 4 for ease of understanding, any order may be used. Furthermore, blocks may be performed in parallel by combinatorial logic circuitry in the node controller 20A. Blocks, portions of the flowchart, or the flowchart as a whole may also be pipelined over multiple clock cycles, if desired.

If redundant execution mode is not active (decision block 70, "no" leg), the node controller 20A may handle the communication normally (block 72). That is, the communication may be scheduled for routing to the processor core 18A-18B to which it is addressed. If the communication is to be routed to each processor core 18A-18B (e.g. a probe), the communication may be independently routed to each processor core. If redundant execution mode is active (decision block 70, "yes" leg), the node controller 20A may route the communication concurrently to each processor core 18A-18B (block 74). For example, in the embodiment of FIG. 2, the communication may be scheduled when it can be routed to each processor core 18A-18B, and may be routed through the crossbar 34 to both processor cores 18A-18B concurrently.

As mentioned previously, in other embodiments a node 12A may include more than two processor cores 18A-18B. Thus, in redundant execution mode, there may be more than one auxiliary core. In some embodiments, all processor cores in a node may be used in redundant execution mode unless an error has been detected (one processor core as the primary processor core and remaining processor cores as the auxiliary processor cores). If an error is detected, in some cases, a processor core may be disabled. In other embodiments, a fixed or programmable number of the processor cores (less than the total number in the node) may participate in redundant execution.

In such embodiments, additional information about the error may be presumed in some cases. For example, if a communication from the primary processor core miscompares with the corresponding communication from each of the auxiliary processor cores, it may be reasonable to conclude that the primary processor core experienced the error. If the primary processor core is programmably selected, a different processor core may be selected as the primary processor core and the previous primary processor core may be disabled. Similarly, if a communication from the primary processor core miscompares with the corresponding communication from only one of the auxiliary processor cores (i.e. the primary processor core's communication matches with the other auxiliary processor cores), it may be reasonable to conclude that the auxiliary processor core experienced the error and the erroring auxiliary processor may be disabled. If a miscompare of a communication from the primary processor core and the corresponding communication from at least two, but not all, of the auxiliary processor cores is detected, diagnostic software may be invoked to determine the error.

Figure 5:
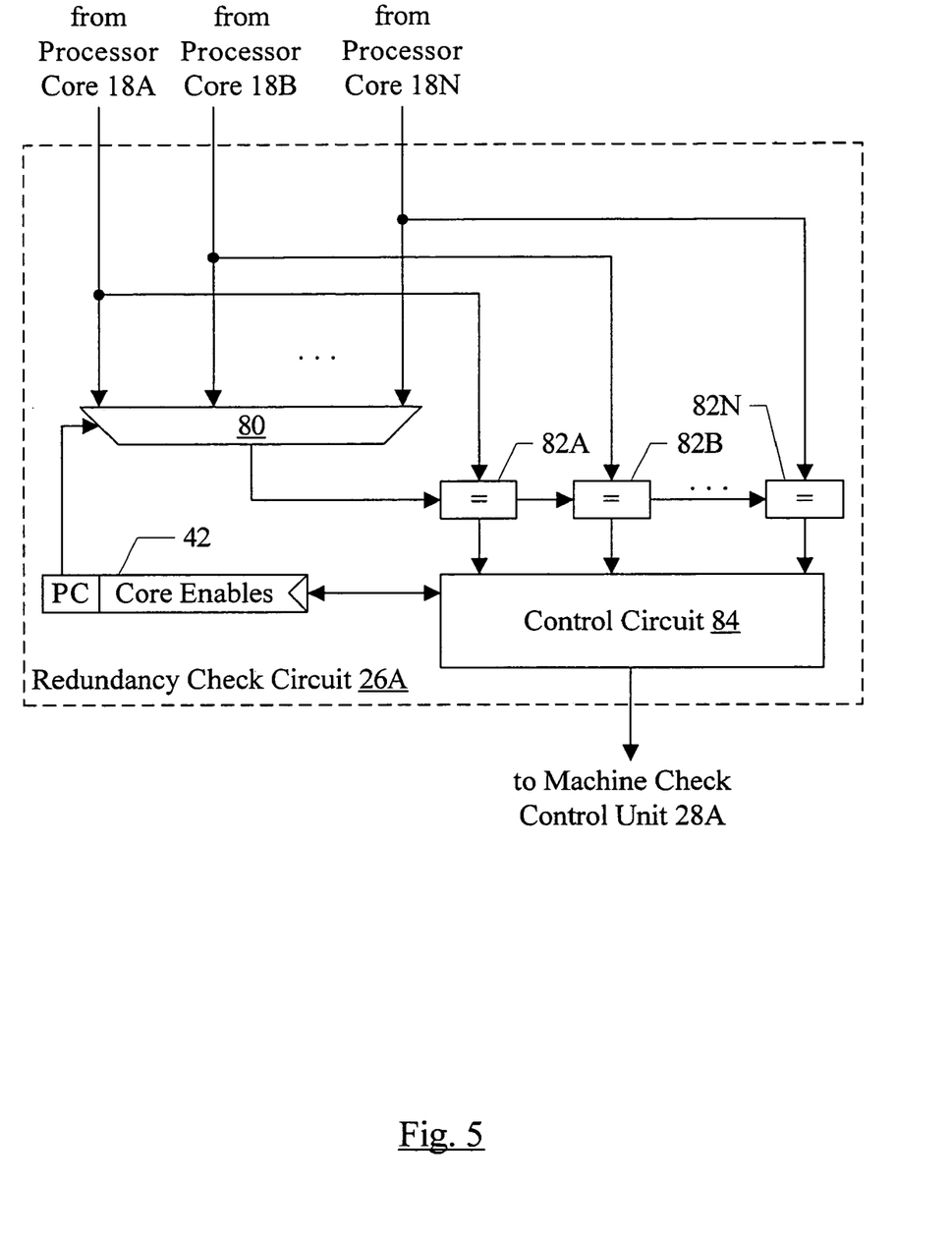
FIG. 5 is a block diagram of one embodiment of the redundancy check circuit for use with "N" processor cores.

FIG. 5 is a block diagram of one embodiment of a portion of the redundancy check circuit 26A that may be used in a node that includes N processor cores, where N is an integer greater than 2. The last processor core is labeled 18N merely to provide a distinct reference numeral in FIG. 5.

The portion of the redundancy check circuit 26A shown in FIG. 5 may include the logic used to compare the communications when there is more than one auxiliary core. The redundancy check circuit 26A receives the communication from each processor core 18A, 18B, to 18N (e.g. from corresponding input flops similar to flops 36A-36B, in one embodiment). The communications are provided to a mux 80 and to respective comparator circuits 82A-82N. The output of the mux 80 is also coupled to the comparator circuits 82A-82N. The outputs of the comparator circuits 82A-82N are coupled to a control circuit 84, which is coupled to the machine check control unit 28A and to the configuration register 42. The configuration register 42 includes a primary core (PC) field encoded to identify which of the processor cores 18A-18N is designated as the primary core. The configuration register 42 may further include a set of core enables which indicate which cores are participating in redundant execution mode. The combination of the core enables may also serve as the redundant execution mode enable, or a separate enable bit may be provided.

In the illustrated embodiment, the primary processor core is designated by programming the configuration register 42. Thus, the communication from the designated processor core is selected through the mux 80 (under control of the value in the PC field) for comparison with the communication from all processor cores. In other embodiments, if the primary processor core is fixedly assigned, the mux 80 may be eliminated in favor of hardwiring the primary processor core's communication lines to the comparator circuits 82A-82N (and a comparator circuit 82A-82N for the primary processor core itself may also be eliminated).

The control circuit 84 may receive the comparison results from the comparators 82A-82N, and may optionally disable a processor core or cores from comparison in the redundant execution mode and/or signal a machine check exception dependent on the comparison results. Additional details are provided below with regard to the FIG. 6.

Figure 6:
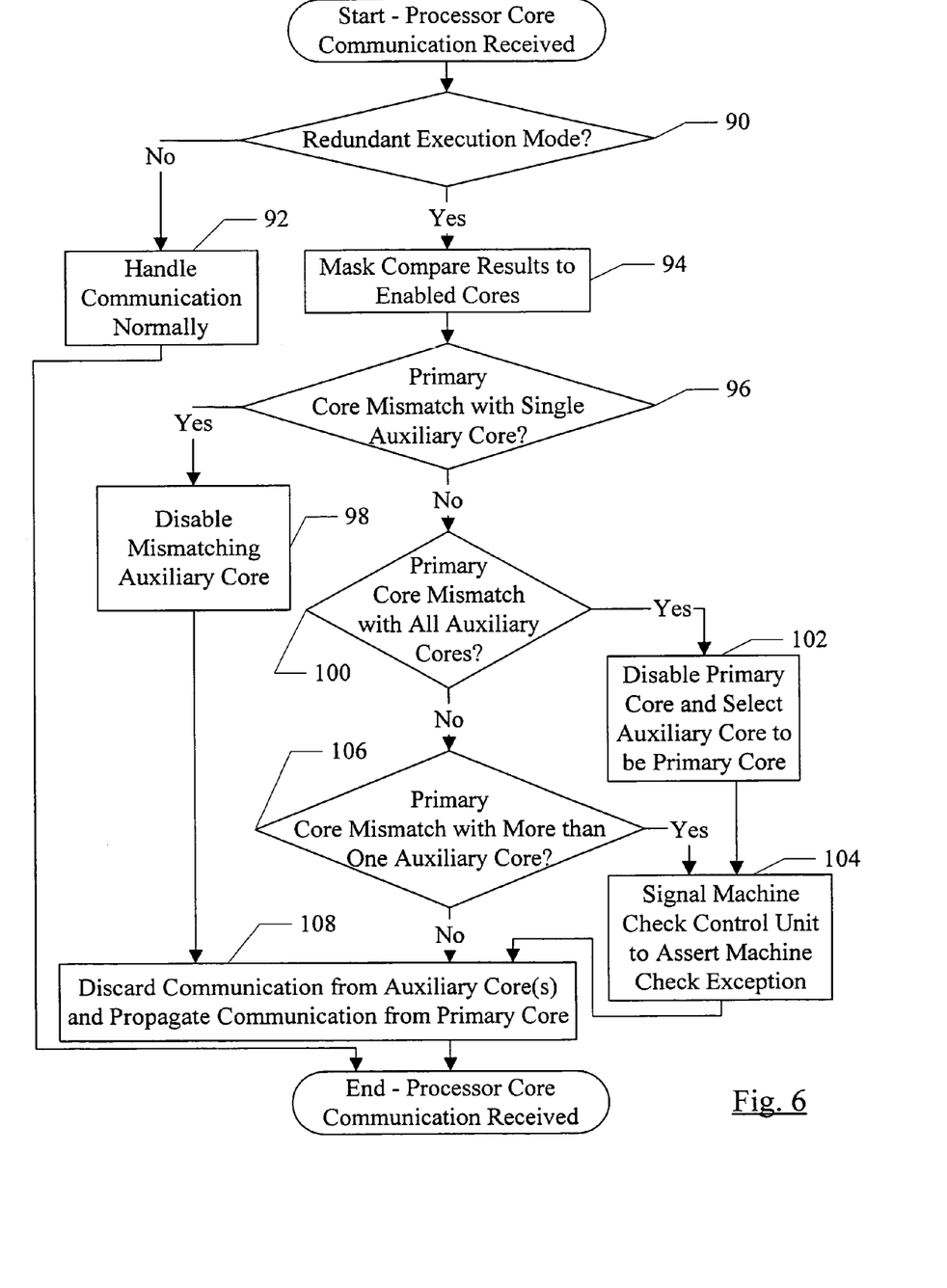
FIG. 6 is a flowchart illustrating operation of one embodiment of the node controller including the redundancy check circuit shown in FIG. 5 in response to receiving a communication from a processor core.

Turning now to FIG. 6, a flowchart is shown illustrating operation of one embodiment of the node controller 20A (including the redundancy check circuit 26A) in response to receiving a communication from a processor core 18A-18N. While the blocks are shown in a particular order in FIG. 6 for ease of understanding, any order may be used. Furthermore, blocks may be performed in parallel by combinatorial logic circuitry in the node controller 20A. Blocks, portions of the flowchart, or the flowchart as a whole may also be pipelined over multiple clock cycles, if desired. The communication received from the processor core 18A-18N may be a request, a response to a previous communication transmitted to the processor core 18A-18N such as a probe or system management message, etc. Handling of communications to be routed to the processor cores 18A-18N may be similar to the flowchart of FIG. 4.

If redundant execution mode is not active (decision block 90, "no" leg), the communication may be handled normally (block 92). That is, no comparison with other communications need be performed. The communication may be handled independent of communications from other processor cores, in general, etc.

If redundant execution mode is active (decision block 90, "yes" leg), the control circuit 84 may mask the comparison results (from the comparator circuits 82A-82N) according to which processor cores are currently enabled, as indicated in the configuration register 42 (block 94). If the masked comparison results indicate that the communication from the primary processor core mismatches with a communication with a single auxiliary processor core (and matches with communications from other auxiliary processor cores—decision block 96, "yes" leg), the control circuit 84 may disable the mismatching auxiliary processor core (block 98).

In one embodiment, the control circuit 84 may merely disable further comparison with the mismatching auxiliary processor core by clearing the enable bit for the mismatching auxiliary processor core in the configuration register 42. The mismatching auxiliary processor core may continue executing. In other embodiments, the control circuit 84 may indirectly or directly disable the mismatching auxiliary processor core from executing (e.g. by causing a machine check exception and having software disable the mismatching auxiliary processor core, by signaling hardware designed to disable the mismatching auxiliary processor core from executing, by holding the mismatching auxiliary processor core in reset, by putting the mismatching auxiliary processor core in a sleep mode, etc.).

If the masked comparison results indicate that the communication from the primary processor core mismatches with all auxiliary processor cores (that are enabled) (decision block 100, "yes" leg), the control circuit 84 may disable the primary processor core and select one of the auxiliary processor cores to be the primary processor core (block 102). As with the discussion above for disabling the auxiliary processor core, the control circuit 84 may simply disable the primary processor core from comparison by clearing the corresponding enable bit in the configuration register 42, or may disable the primary processor core from executing at all. The control circuit 84 may also update the PC field of the configuration register 42 to reflect the newly selected primary processor core. The control circuit 84 may use any selection mechanism. For example, the processor cores may be numbered (e.g. 0 to N−1), and the control circuit 84 may increment the number of the presently selected primary processor core to select a new primary processor core. If one or more processor cores are disabled in the configuration register 42, the control circuit 84 may increment until an enabled processor core is selected. Additionally, the control circuit 84 may signal the machine check control unit 28A to assert a machine check exception (e.g. to the newly selected primary processor core—block 104) to permit diagnostic software to perform any desired additional error handling. Alternatively, a machine check exception may not be signalled for this case in other embodiments.

If the masked comparison results indicate that the communication from the primary processor core miscompares with more than one auxiliary processor core, but not all auxiliary processor cores (decision block 106, "yes" leg), the control circuit 84 may signal the machine check control unit 28A to assert a machine check exception (e.g. to the primary processor core) to permit diagnostic software to attempt to locate the error (block 104).

Generally, in each of the mismatch cases and the case of no mismatch, the node controller 20A may discard the communications from the auxiliary processor cores and propagate the communication from the primary processor core (block 108).

In another embodiment, a node 12A may include N processor cores 18A-18N, where N is an even integer (although 18N is used merely as a unique reference character). The processor cores may be configured as N/2 pairs of redundant processor cores. Each pair may redundantly execute different software code from other pairs. In some embodiments, the processor cores may be preassigned into pairs for redundant execution purposes. For example, "odd" and "even" processor cores may be paired (numbering the processor cores from 0 to N−1 as mentioned above). Thus, processor cores 18A-18B may be paired, as may other odd and even pairings up to processor cores 18M and 18N. Alternatively, processor core pairings may be programmable.

In a CMP embodiment of the node 12A having N/2 redundant processor cores, N/2 separate code sequences may be redundantly executed concurrently within a single integrated circuit. That is, the CMP embodiment may provide a redundant, multiprocessing solution in a single chip implementation.

Figure 7:
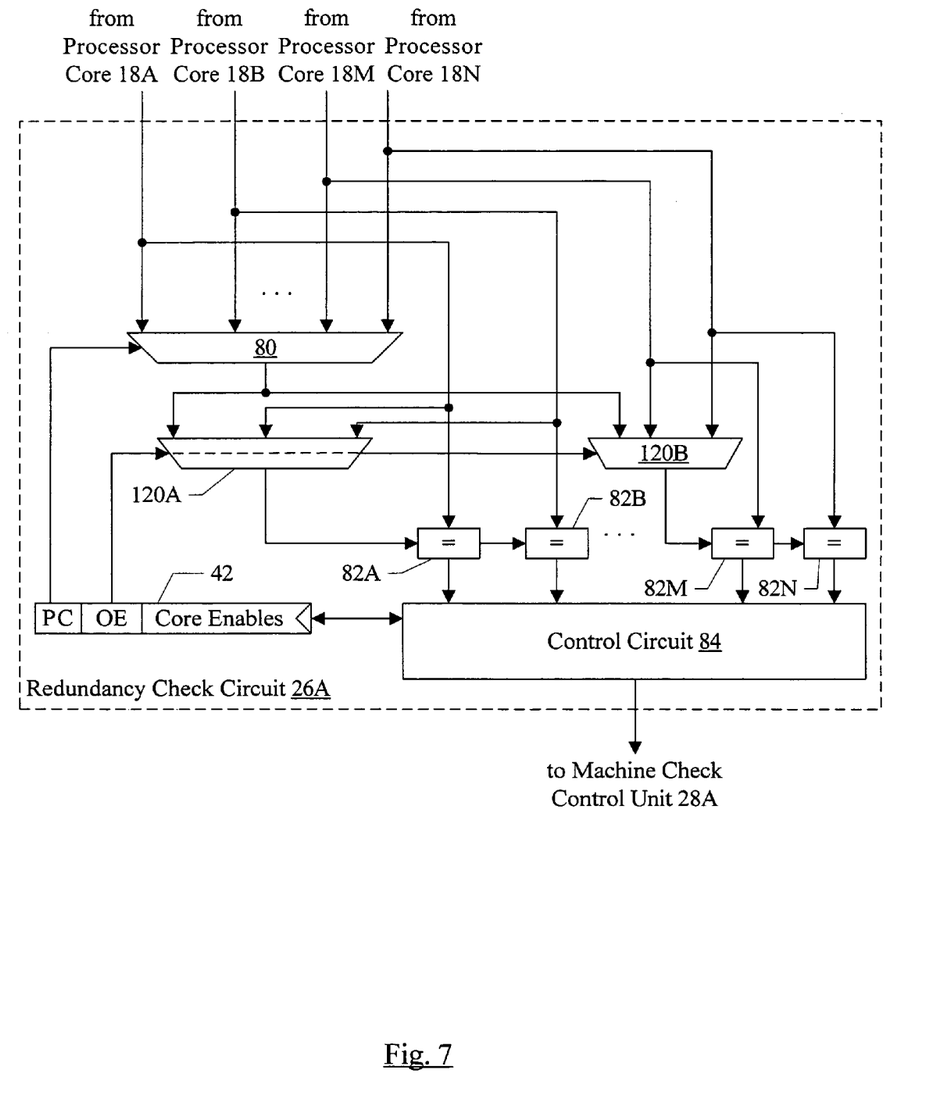
FIG. 7 is a block diagram of another embodiment of the redundancy check circuit for use with "N" processor cores.

FIG. 7 is an example block diagram of a redundancy check circuit 26A that may support both a first redundancy mode having a single primary processor core with multiple auxiliary processor cores and a paired redundancy mode having paired sets of redundant processor cores. In the embodiment of FIG. 7, the mux 80 is provided to select communications from the various processor cores including the processor cores 18A, 18B, 18M, and 18N. The mux 80 is controlled by the PC field of the configuration register 42 as previously described. However, rather than being directly coupled to the comparators 82A-82N, the output of mux 80 is provided as an input to a set of muxes such as muxes 120A-120B. There may be a mux similar to muxes 120A-120B for each pair of processor cores in the node 12A. Each mux 120A-120B may be further coupled to receive the communications from one pair of processor cores (e.g. mux 120A is coupled to receive the communications from the processor cores 18A-18B and the mux 120B is coupled to receive the communications from the processor cores 18M-18N). The output of each mux 120A-120B is coupled as an input to a pair of comparators 82A-82N (e.g. the output of the mux 120A is coupled to the comparators 82A-82B and the output of the mux 120B is coupled to the comparators 82M-82N). Each comparator 82A-82N has another input coupled to receive a communication from a different one of the processor cores 18A-18N and an output coupled to the control circuit 84.

If paired redundancy mode is selected (via an OE field in the configuration register 26A), the muxes 120A-120B may select a communication from one of the odd or even processor cores to which it is coupled. If paired redundancy mode is not selected, the muxes 120A-120B may select the output of the mux 80. If paired redundancy mode is not selected, the operation of the redundancy check circuit 26A may be similar to that described above with regard to FIGS. 5 and 6. Operation of each pair of processor cores in the paired redundancy mode may be similar to that described above with regard to FIG. 3.

For example, the OE field may comprise two bits, one for the odd processor core and one for the even processor core. Setting the bit for the odd processor core may cause selection of the odd processor core communications through the muxes 120A-120B. Setting the bit for the even processor core may cause selection of the even processor core communications through the muxes 120A-120B. If both bits are clear, paired redundancy mode is not selected. In other embodiments, the opposite meanings may be assigned to the set and clear states of the bits, or other encodings may be used for the OE field.

The odd or even processor core selected via the OE field may be viewed as the primary processor core of the pair. In other embodiments, the OE field may be used to select the paired redundancy mode and either the odd processor core or the even processor core may be preassigned as the primary processor core. In such embodiments, each mux 120A-120B may be coupled to receive the output of the mux 80 and either the odd processor core communication or the even processor core communication, whichever is preassigned as the primary processor core. In still other embodiments, the redundancy check circuit may not support the first redundancy mode (having one primary processor core and multiple auxiliary processor cores) and the mux 80 may be eliminated. In other such embodiments, the muxes 120A-120B may also be eliminated and pairs of processor cores may be hardwired to a single comparator circuit for that pair, similar to the embodiment of FIG. 2. Additionally, the core enables in the configuration register 42 may be used to selectively enable various pairs for redundant execution. The comparison of communications in FIG. 7 may be based on receiving valid communications, or may be on a clock cycle by clock cycle basis (where a communication may be the state of the signals on a given clock cycle for comparison purposes).

Numerous variations and modifications will become apparent to those skilled in the art once the above disclosure is fully appreciated. It is intended that the following claims be interpreted to embrace all such variations and modifications.

What is claimed is:

1. A node comprising:
a plurality of processor cores; and
a node controller coupled to the plurality of processor cores and configured to route communications from the plurality of processor cores to other devices in a computer system, wherein the node controller comprises a circuit coupled to receive the communications from the plurality of processor cores and, in a redundant execution mode in which at least a first processor core of the plurality of processor cores is redundantly executing code that a second processor core of the plurality of processor cores is also executing, the circuit is configured to compare communications from the first processor core to communications from the second processor core to verify correct execution of the code, and wherein the node controller is configured to discard communications from the first processor core responsive to comparing the communications to corresponding communications from the first processor core and verifying that the communications and corresponding communications match.

2. The node as recited in claim 1 wherein the circuit is configured to compare a first communication from the first processor core to a second communication from the second processor core, wherein the first communication and the second communication are received concurrently by the circuit.

3. The node as recited in claim 2 wherein, if a valid communication is received from a first one of the first processor core and the second processor core and no valid communication is received from the other one of the first processor core and the second processor core, the circuit is configured to signal an execution error.

4. The node as recited in claim 2 wherein a separate communication path is provided between each of the plurality of processor cores and the node controller.

5. The node as recited in claim 1 wherein, if the circuit detects a mismatch between a first communication from the first processor core and a corresponding second communication from the second processor core, the circuit is configured to signal an execution error.

6. The node as recited in claim 5 wherein signalling the execution error comprises signalling a machine check exception.

7. The node as recited in claim 1 wherein the node controller is configured to propagate communications from the second processor core.

8. The node as recited in claim 7 wherein the node controller, in response to receiving a response to a communication propagated from the second processor core, is configured to route the response to both the first processor core and the second processor core.

9. The node as recited in claim 1 wherein a plurality of the plurality of processor cores are configured to redundantly execute the code in the redundant execution mode, wherein the plurality of the plurality of processor cores include the first processor core, the second processor core, and at least one other processor core.

10. The node as recited in claim 9 wherein one of the plurality of the plurality of processor cores is a primary processor core and remaining ones of the plurality of the plurality of processor cores are auxiliary processor cores, and wherein the circuit is configured to select communications received from the primary processor core for comparison to each of the plurality of the plurality of processor cores.

11. The node as recited in claim 10 wherein, if the circuit detects a mismatch between a communication from the primary processor core and a corresponding communication from only one auxiliary processor core, the circuit is configured to disable comparison of communications from that auxiliary processor core.

12. The node as recited in claim 10 wherein, if the circuit detects a mismatch between a communication from the primary processor core and a corresponding communication from each of the auxiliary processor cores, the circuit is configured to disable the primary processor core and select one of the auxiliary processor cores as the primary processor core.

13. The node as recited in claim 10 wherein, if the circuit detects a mismatch between a communication from the primary processor core and a corresponding communication from at least two of the auxiliary processor cores but not all of the auxiliary processor cores, the circuit is configured to signal an execution error.

14. The node as recited in claim 1 wherein the plurality of processor cores comprise a plurality of pairs of processor cores, and wherein each pair of the plurality of pairs of processor cores is configured to redundantly execute code independently of other pairs of the plurality of pairs of processor cores.

15. The node as recited in claim 1 wherein the plurality of processor cores and the node controller are integrated onto a single integrated circuit.

16. A method comprising:
running at least a first processor core of a plurality of processor cores and a second processor core of the plurality of processor cores in a redundant execution mode in which the first processor core redundantly executes the same code that the second processor core is executing;
verifying correct execution of the code in a node controller coupled to the plurality of processor cores, the verifying including comparing communications received in the node controller from the first processor core and the second processor core; and
discarding communications received from the first processor core and propagating corresponding communications received from the second processor core responsive to verifying that the communications from the first processor core match the corresponding communications from the second processor core.

17. The method as recited in claim 16 wherein the comparing comprises comparing concurrently received communications.

18. The method as recited in claim 17 further comprising detecting a mismatch in the concurrently received communications and signalling an execution error.

19. The method as recited in claim 16 wherein the running at least the first processor core and the second processor core in the redundant execution mode comprises running each of the plurality of processor cores in the redundant execution mode, wherein one of the plurality of processor cores is a primary processor core and remaining ones of the plurality of processor cores are auxiliary processor cores, the method further comprising:

responsive to detecting a mismatch between a communication from the primary processor core and a corresponding communication from only one auxiliary processor core, disabling comparison of communications from that auxiliary processor core;

responsive to detecting a mismatch between a communication from the primary processor core and a corresponding communication from each of the auxiliary processor cores, disabling the primary processor core and selecting one of the auxiliary processor cores as the primary processor core; and responsive to detecting a mismatch between a communication from the primary processor core and a corresponding communication from at least two of the auxiliary processor cores but not all of the auxiliary processor cores, signalling an execution error.

* * * * *